United States Patent
Kumar

(10) Patent No.: US 11,829,379 B2
(45) Date of Patent: Nov. 28, 2023

(54) METHODS AND SYSTEMS OF A MATCHING PLATFORM FOR ENTITITES

(71) Applicant: Shirish Kumar, Saratoga, CA (US)

(72) Inventor: Shirish Kumar, Saratoga, CA (US)

(73) Assignee: LiveRamp, Inc., San Francisco, CA (US)

(*) Notice: Subject to any disclaimer, the term of this patent is extended or adjusted under 35 U.S.C. 154(b) by 88 days.

(21) Appl. No.: 17/320,205

(22) Filed: May 13, 2021

(65) Prior Publication Data

US 2022/0012258 A1    Jan. 13, 2022

Related U.S. Application Data

(60) Provisional application No. 63/024,302, filed on May 13, 2020.

(51) Int. Cl.
| | |
|---|---|
| *G06F 16/25* | (2019.01) |
| *G06F 16/23* | (2019.01) |
| *G06F 16/28* | (2019.01) |
| *G06F 16/2455* | (2019.01) |

(52) U.S. Cl.
CPC ........ *G06F 16/252* (2019.01); *G06F 16/2365* (2019.01); *G06F 16/2379* (2019.01); *G06F 16/24568* (2019.01); *G06F 16/285* (2019.01); *G06F 16/288* (2019.01)

(58) Field of Classification Search
CPC ............... G06F 16/252; G06F 16/2365; G06F 16/2379; G06F 16/24568; G06F 16/285; G06F 16/288; G06F 16/2433
See application file for complete search history.

(56) References Cited

U.S. PATENT DOCUMENTS

| | | | |
|---|---|---|---|
| 2017/0039252 A1* | 2/2017 | Bustelo | G06F 16/2477 |
| 2017/0060937 A1* | 3/2017 | Joshi | G06F 16/2322 |
| 2018/0218069 A1* | 8/2018 | Rege | G06Q 40/025 |
| 2019/0208007 A1* | 7/2019 | Khalid | H04L 67/1021 |

* cited by examiner

*Primary Examiner* — Mariela Reyes
*Assistant Examiner* — Fatima P Mina

(57) ABSTRACT

In one aspect, a computerized method for implementing a matching platform for entities includes the step of, in a real-time data processing layer, implementing a real-time linking on an input event stream. The method includes storing an output of the real-time linking in a state change store. The method includes the step of, in a high-throughput layer, implementing a high-throughput linking of entities from a batch data source stream. The method includes storing an output of the high-throughput linking of entities in a state store to generate a unified and consistent view of the entities across a different representation of the entities. The method includes implementing an on-demand linking using the state change store and the state store.

17 Claims, 13 Drawing Sheets

```
Run A:
ID1: {e1, e2, e3, e4} -> C1
ID2: {e5, e6, e7} -> C2

Run B:
{e1, e2, e3} -> B1
{e5, e6, e7, e9} -> B2
{e4, e8} -> B3 e4 cluster changed. e8 & e9
are new.
What should be the ID of B1
and B3?

Probably:
B1 -> ID1,
B2 -> ID2, and
B3 -> ID3 (new ID)
```

```
// returns zip_code with the highest cardinality.
SELECT MOST_FREQUENT(zip_code)

// returns a vector of monthly payment made by the entity (customer)
SELECT MONTHLY(payment)

// runs the spend inference function on the data return by query names spend_features
INFER(spend, model_id) as inferred_spend FROM spend_features
SELECT spend, transaction_timestamp, zip_code // Date when the entity was last active
SELECT LAST_ACTIVE()

// Date when the entity was first active
SELECT FIRST_ACTIVE()
```

METHODS AND SYSTEMS OF A MATCHING PLATFORM FOR ENTITITES

CLAIM OF PRIORITY

This application claims priority to U.S. Provisional Application No. 63/024,302 filed on 13 May 2020 and titled METHODS AND SYSTEMS OF A MATCHING PLATFORM FOR ENTITIES. This provisional application is hereby incorporated by reference in its entirety.

BACKGROUND

Many enterprises have embarked on a digital transformation journey in order to achieve customer-centricity. Customer-centricity involves building a comprehensive, unified customer profile. Traditionally, enterprises have used various platforms, such as those that use Customer Master Data Management (MDM) and/or a Customer Data Platform (CDP), to unify their customer data. While these platforms can perform customer data unification, they are limited to a narrow set of use cases. Additionally, they do not scale properly to encompass a large volume and variety of data.

For example, MDM-based platforms are primarily driven by IT organizations to integrate and manage various data systems. MDM-based platforms do not scale to unify transaction-level details. Instead, the traditional incremental unification approach provided by MDM uses incremental match-and-merge methods that do not scale as the data size grows.

Likewise, CDP-based platforms are often used to primarily address marketing needs. Accordingly, CDP-based platforms are often built to perform identity stitching. Identity stitching may require a common identifier across different data sources for data unification. However, CDP-based platforms cannot handle data variety where there is a lacking common identifier.

Moreover, neither the MDM-based nor the CDP-based platforms provide the level of sophisticated data unification that is vital for digital transformation. They may have unification capabilities for their narrow use cases but are not good enough for digital transformation. Digital transformation requires organization-wide availability of unified profiles to support various use cases such as: customer support, compliance, marketing, product development, and sales. This process entails unification and automatic resolution across a wide variety of data streams both in batches and in real-time.

Accordingly, improvements to current MDM-based and CDP-based platforms are desired. As provided in the present disclosure, these improvements include a Lambda Architecture matching platform for entities that uses a real-time data processing layer and a high-throughput layer with an on-demand linking step to bring all the variations of a real-world entity together into a unified customer data profile.

BRIEF SUMMARY OF THE INVENTION

In one aspect, a computerized method for implementing a matching platform for entities includes the step of, in a real-time data processing layer, implementing a real-time linking on an input event stream. The method includes storing an output of the real-time linking in a state change store. The method includes, in a high-throughput layer, implementing a high-throughput linking of entities from a batch data source stream and storing an output of the high-throughput linking of entities in a state store to generate a unified and consistent view of the entities across a different representation of the entities. The method includes implementing an on-demand linking using the state change store and the state store.

BRIEF DESCRIPTION OF THE DRAWINGS

FIG. 7 illustrates an example schematic illustrating stable identifier (ID) assignment, according to some embodiments.

FIG. 10 illustrates an example schematic of a composite profile creation, according to some embodiments.

Figure 1A:
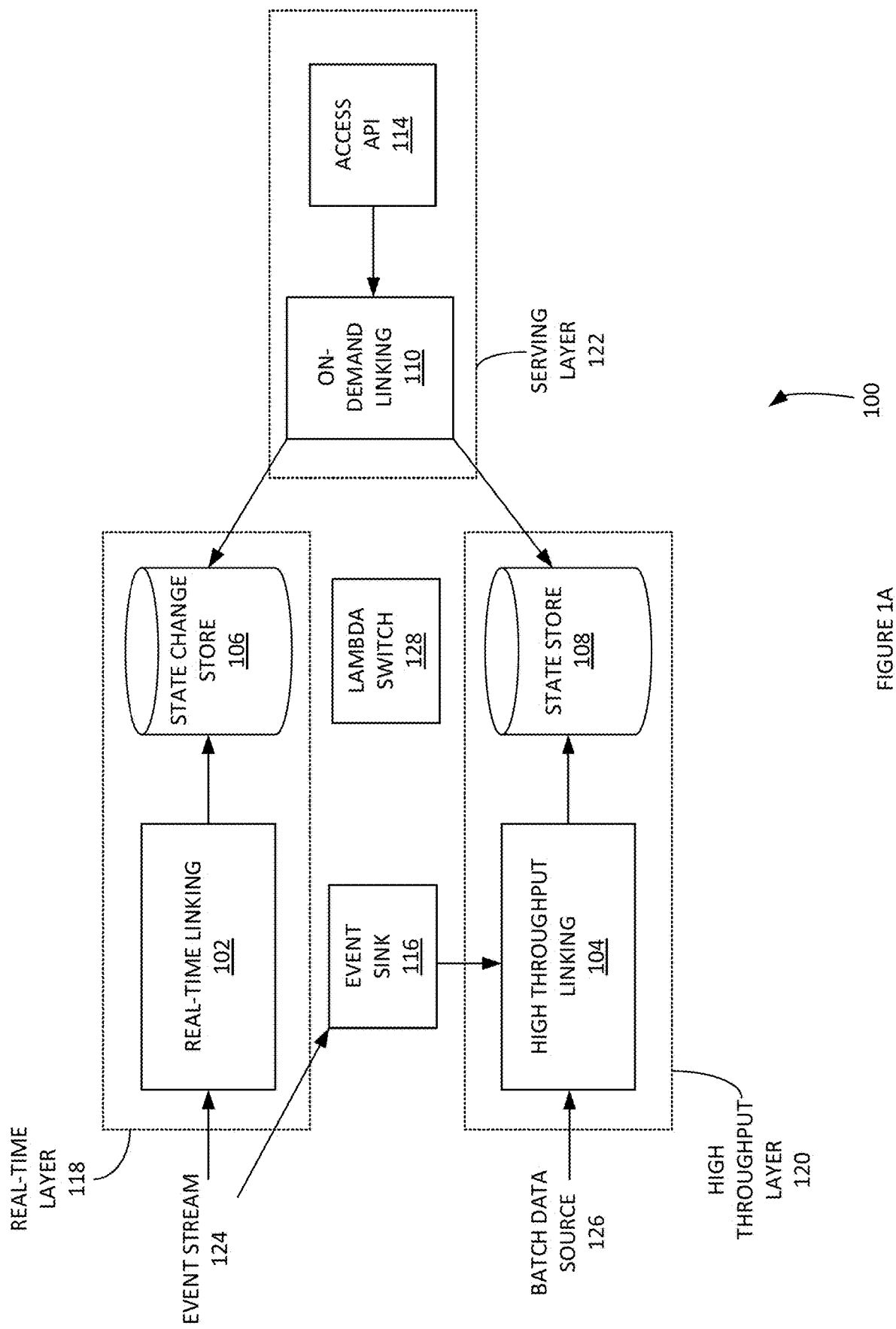
FIG. 1A illustrates an example system for implementing a matching platform for entities, according to some embodiments.

The Figures described above are a representative set and are not exhaustive with respect to embodying the invention.

DESCRIPTION

Disclosed are a system, method, and article of matching platform for entities. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can be an application specific computing interface to allow third parties to extend the functionality of a software application.

Bidirectional Encoder Representations from Transformers (BERT) is a transformer-based machine learning technique for natural language processing (NLP) pre-training.

Cloud computing can be the on-demand availability of computer system resources, especially data storage and computing power, without direct active management by the user.

Correlation clustering provides a method for clustering a set of objects into the optimum number of clusters without specifying that number in advance.

Entity refers to a real-world artifact such as, inter alia: a person, company, product, parts, etc. For example, a person can take different forms such as: customer, patient, user, etc. Similarly, a company can be a business entity that can be, inter alia: a merchant, supplier, providers of a service, etc.

Identifying attributes of an entity are the attributes that act as a contributing factor to identify a real-world entity.

Entity Query Language (EQL) is a declarative language that follows similar syntax supported by SQL. EQL enables users to describe operations that can be performed on an entity (e.g. customers, etc.). These operations include, inter alia: aggregations, union, intersections, best-value calculations, etc. EQL is parsed and translated into code. The code is then executed on the entity data to calculate the results. For example, a customer of a retail company can be defined by name, addresses (one or more), emails, telephone numbers, shopping locations, web site cookies, website activities, etc.

High-throughput linking can use a software module that creates clusters of records that correspond to real-world entities. The software module can process large amounts of data (e.g. in the range of hundreds of terabytes, etc.) stored on disk in one batch. It can be configured to run every few hours.

Linking can include the task of identifying records that belong to the same real-world entity. Linking creates clusters of records that belong to real-world entities.

Machine learning (ML) is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Maximum likelihood estimation (MLE) is a method of estimating the parameters of a probability distribution by maximizing a likelihood function, so that under the assumed statistical model the observed data is most probable. The point in the parameter space that maximizes the likelihood function is called the maximum likelihood estimate.

Near-neighbor is a group of entities selected from the universe of entities that likely belong to the same real-world entity.

On-demand linking can use a software module that provides an API which can be called by an external software application. The external software application can call the API with the records that it wants to be linked.

Real-time linking can use a software module that creates clusters of records that belong to real world entities. This software module continuously consumes data from a data stream in micro-batch intervals (e.g. of less than a minute, etc.) and processes micro-batches of data as they arrive in the data stream. High-throughput linking can be meant to process large amounts of data, whereas real-time linking can be meant to process small data quickly (e.g. on the order of less than a minute, etc.).

Transfer learning (TL) uses machine learning (ML) to focus on storing knowledge gained while solving one problem and applying it to a different but related problem.

Transitive closure of a binary relation R on a set X is the smallest relation on X that contains R and is transitive.

Example Methods and Systems

FIG. 1A illustrates an example system 100 for implementing a matching platform for entities, according to some embodiments. It is noted that entities can include, inter alia, customer data about a person, company, product, parts, etc. System 100 can be used for the task of identifying records that belong to the same real-world entity (e.g. linking processes, etc.).

As shown, system 100 includes a high-throughput linking 104 that stores its output to a state store 108. This can be performed in high-throughput layer 120. A high-throughput layer 120 can be a software module that can process large amounts of data (e.g. hundreds of terabytes) using a cluster of machines (e.g. computer hardware and/or software systems).

System 100 includes a real-time linking 102 that stores its output to a state change store 106. This can be performed in real-time layer 118.

System 100 includes an on-demand linking 110 that reads from the state store 108 and stage change store 106. System 100 includes an access API 114 that invokes on-demand linking 110. This can be performed in serving layer 122. Serving layer 122 serves the latest state of entities when an external application performs queries.

It is noted that, in some example embodiments, a layer can be a software module that performs a well-defined set of tasks. A layer can define a list of interfaces and APIs through which other modules can interact with it.

A batch data source 126 can be from a data storage which stores large amounts of data on storage disks. An event stream 124 (e.g. a real-time data source and/or streaming data source) includes data that is delivered as a continuous stream of records.

A high-throughput linking 104 can be a software module that can process large amounts of data (e.g. hundreds of terabytes) using a cluster of machines (e.g. computer hardware and/or software systems). High-throughput linking 104 can read data from batch data sources and performs linking at a defined interval usually every few hours or every few days. Depending on the input data size, the processing may take a few hours to a few days.

A real-time linking 102 can be a software module that reads data from an event stream and performs linking data every few seconds. This process usually takes less than a few seconds.

An on-demand linking 110 can be a software module that performs linking in response to a query from an external application via synchronous API calls. The query for linking contains full or partial information (e.g. name and address of a customer or email address of a customer) about one or more entities. Based on the query, on-demand linking 110 reads both state store 108 and stage change store 106 and performs matching and returns the matched results back.

System 100 can also interact with an application configuration layer (not shown). In some examples, an application configuration layer can be a software module that is used to change the configuration/behavior of the high-throughput layer 120, as high-throughput layer 120 processes large amounts of data in batches. Batch intervals can vary from a few hours, a day, etc. This can be a customization on top of the data processing layers.

A Lambda Switch 128 ensures that entities' state remain consistent as it switches from an old generation of state to a new generation. Lambda Switch 128 provides for the serving layer 122 to continue serving the queries without any downtime. The Lambda Switch 128 provides a critical functionality that ensures that both real-time layer 118 and high-throughput layer 120 continue to work seamlessly. Accordingly, Lambda Switch 128 provides the ability to process massive amounts of data as well as the ability to reduce latency while processing real-time data.

It is noted that system 100 performs both high-throughput linking 104 and real-time linking 102. In some examples, high-throughput layer 120 performs linking of large batches of data every few hours, while real-time linking 102 performs linking on a data stream. High-throughput 104 linking ensures the accuracy and comprehensiveness of the linking. Real-time linking 102 minimizes the latency of stream data. System 100 combines these two layers (i.e. high-throughput 104 and real-time linking 102) to provide the benefit of accuracy, comprehensiveness, and low latency. Lambda Switch 128 can be the software module that ensures that data remains consistent across these two layers.

The output of real-time linking 102 can be stored in a state change store 106. System 100 can store the output of high-throughput linking 104 in a state store 108. Additional details of real-time linking 102 and high-throughput linking 104 are provided infra.

System 100 can implement on-demand linking 110 using the state change store 106 and the state store 108. It is noted that a state of an entity represents different attributes of an entity at a given point in time. For example, at a given time, a person entity can be represented by a name, a set of addresses, telephone numbers, emails, etc. A stage change of an entity represents changes to an already existing entity's state when new information about the entity is processed. Accordingly, a state change store 106 is a database where the changes to state of entities are stored. Furthermore, a state store 108 is a database which stores entities (e.g. person, product, etc.).

Entity matching of system 100 can be used to resolve the following, inter alia: attribute ambiguity (e.g. same name may refer to different individuals); missing value(s) (e.g. missing email, address); data entry errors (e.g. misspelled names, extra digits); changing attributes (e.g. name change, address change); multi-relational (e.g. family relation); etc. System 100 can be used to bring all the variations of a real-world entity together. Accordingly, entities (e.g. any type of real-world entity, such as, a person, a merchant, etc.) can be matched using system 100.

It is noted that the linking process can be repeated using different matching rules to generate different variations of the matched entities or match different types of entities. It can also be used to generate relationships between entities. These relationships can be hierarchical or associative. For example, linking can resolve subsidiary relationships between a parent and its subsidiaries.

Figure 1B:
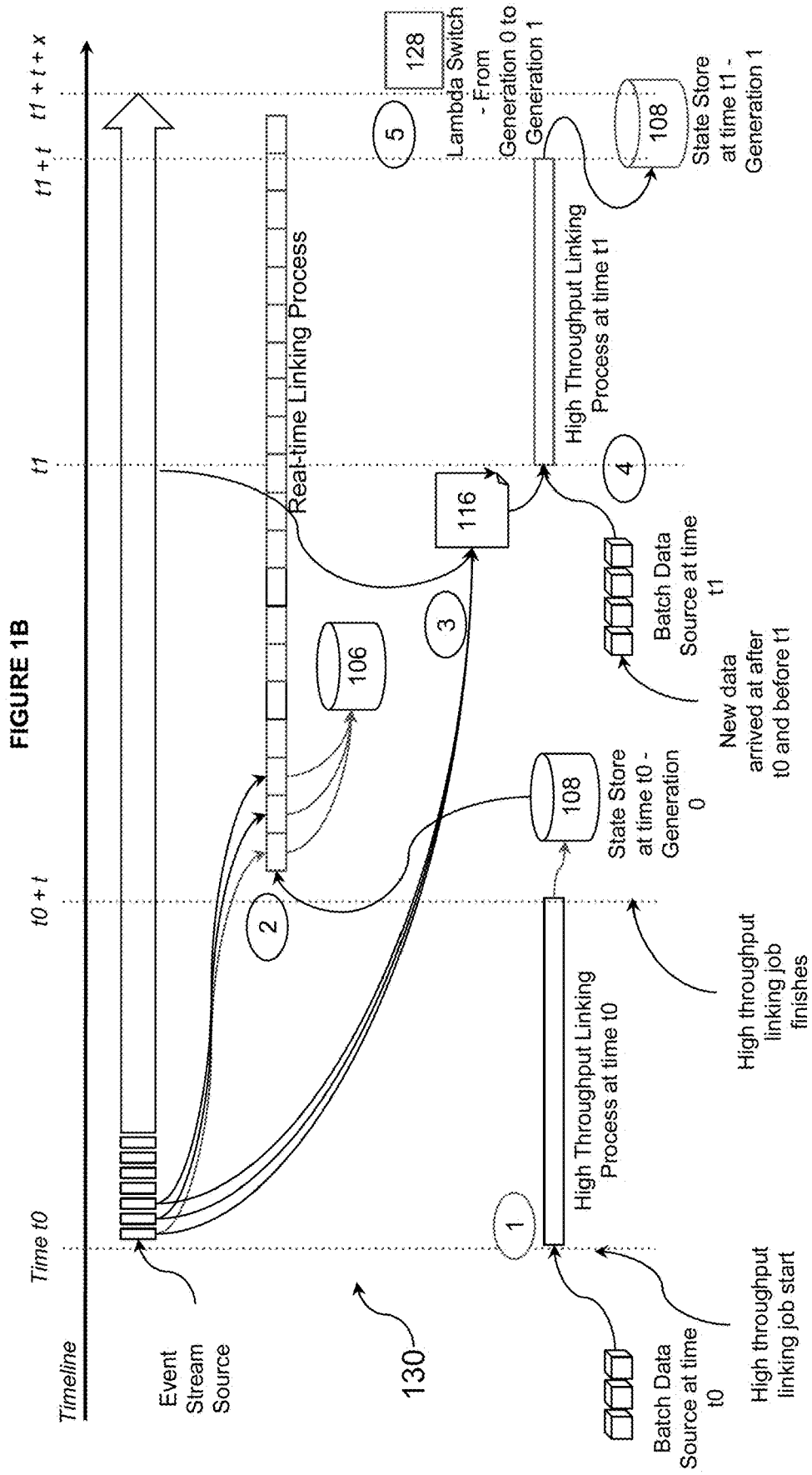
FIG. 1B illustrates an example process for implementing a matching platform for entities, according to some embodiments.

FIG. 1B illustrates an example process 130 for implementing a matching platform for entities, according to some embodiments. In step 1, high-throughput linking 104 reads data from batch data sources at time t0. High-throughput linking 104 performs linking and saves the output in the state store 108. The state store 108 stores the states of all entities at time t0. This output can be labeled state Generation 0. Process 130 can mark this as the current state store.

In step 2, real-time linking 102 is implemented as a continuous process. Real-time linking 102 reads data from the event stream every few seconds (e.g. in micro batches). Real-time linking 102 reads data from the state store and performs linking, applies the change on the state of the affected entities, and saves the results in the stage change store 106. The output of real-time linking 102 represents the latest state of an entity.

Step 3 is now discussed. When an external application calls the API 114 to perform a query about an entity, API 114 calls the on-demand linking 110. On-demand linking 110 reads both the state store 108 (e.g. includes generation 0) and state change store 106. Based on what is read, on-demand linking 110 performs linking and returns the results. The event stream data is also persisted in an event sink 116. As the time passes, the batch data sources may receive more data.

In step 4, at time t1 (e.g. which can be after a few hours or few days after t0) the high-throughput linking 104 runs. At this point in time, process 100 reads the batch data sources at time t1 and the event sink 116. This run produces a new state store marked as generation 1. This generation of the state stores contains the states of all entities constructed using the data received from both batch and real-time sources at time t1.

In step 5, at time t1+t+x, Lambda Switch 128 invalidates generation 0 of the state store 108, adjusts the state change store, and makes Generation 1 the current state store. After the switch, on-demand linking 110 switches to generation 1 of the state store to serve any queries. Lambda Switch 128 can serve two purposes here. First, Lambda Switch 128 ensures that the switch from generation 0 to generation 1 (e.g. the next generation) does not make states of entities inconsistent. Second, Lambda Switch 128 ensures that there is no downtime for on-demand linking 110 (e.g. on-demand linking 110 can continue serving an external application).

Figure 2:
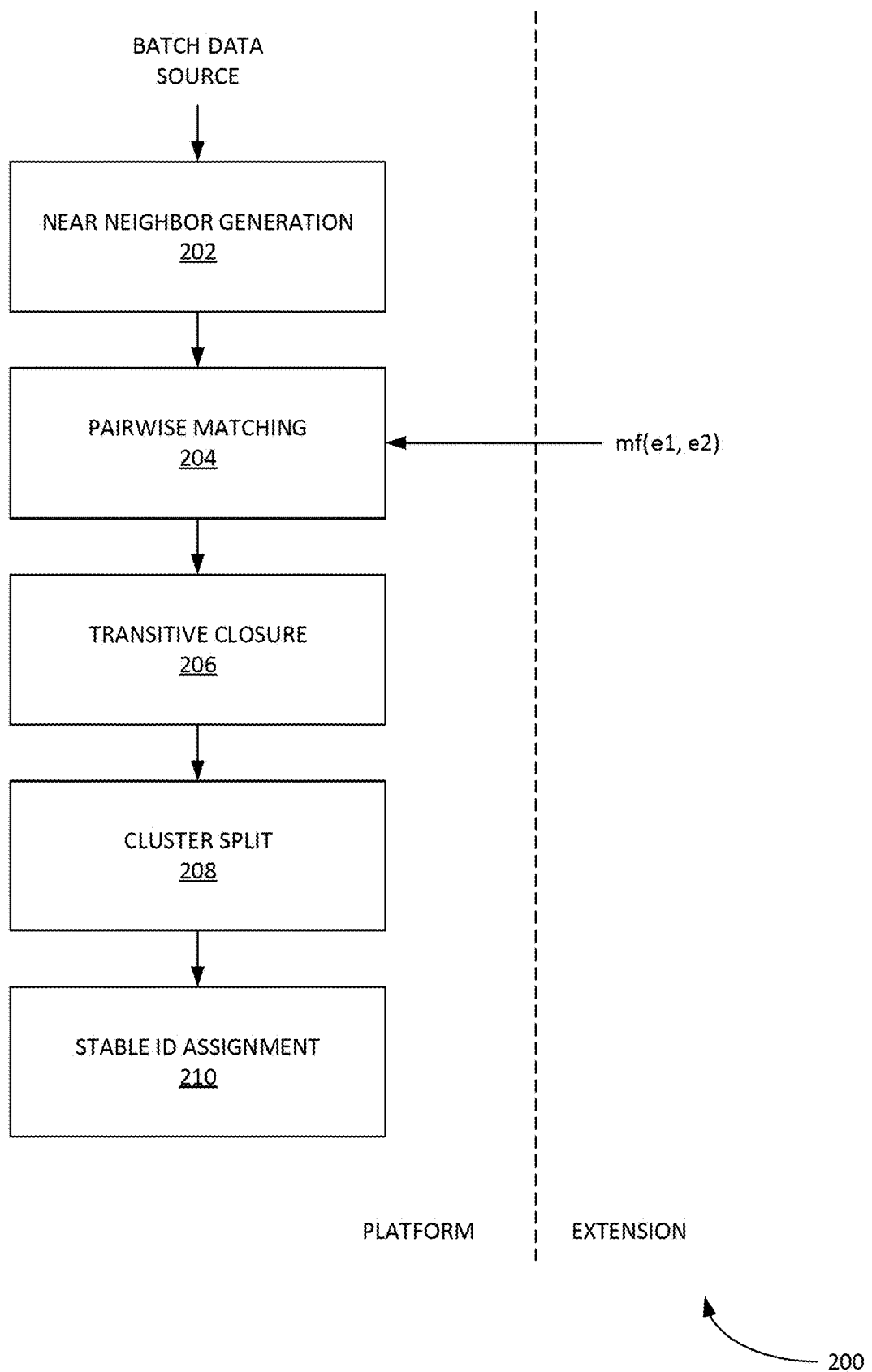
FIG. 2 illustrates an example process for implementing high-throughput linking in a matching platform for entities, according to some embodiments.

FIG. 2 illustrates an example process 200 for implementing high-throughput linking in a matching platform for entities, according to some embodiments. Process 200 illustrates various steps implemented for a linking process. High-throughput linking can be tuned toward accuracy, etc. In step 202, process 200 can implement near neighbor generations. Pairwise matching can be implemented within each cluster. This can reduce the number of iterations needed to make comparisons in the matching process. Step 202 generates identities that are likely to match.

Step 202 can generate sufficient groups such that if two identities match, they are included into a single block (e.g. of blocks of groups of near neighbors 304 provided infra). Additionally, step 202 can ensure that said blocks are not too large (e.g. beyond a specified threshold). Step 202 can return a set of blocks of identities.

Figure 3:
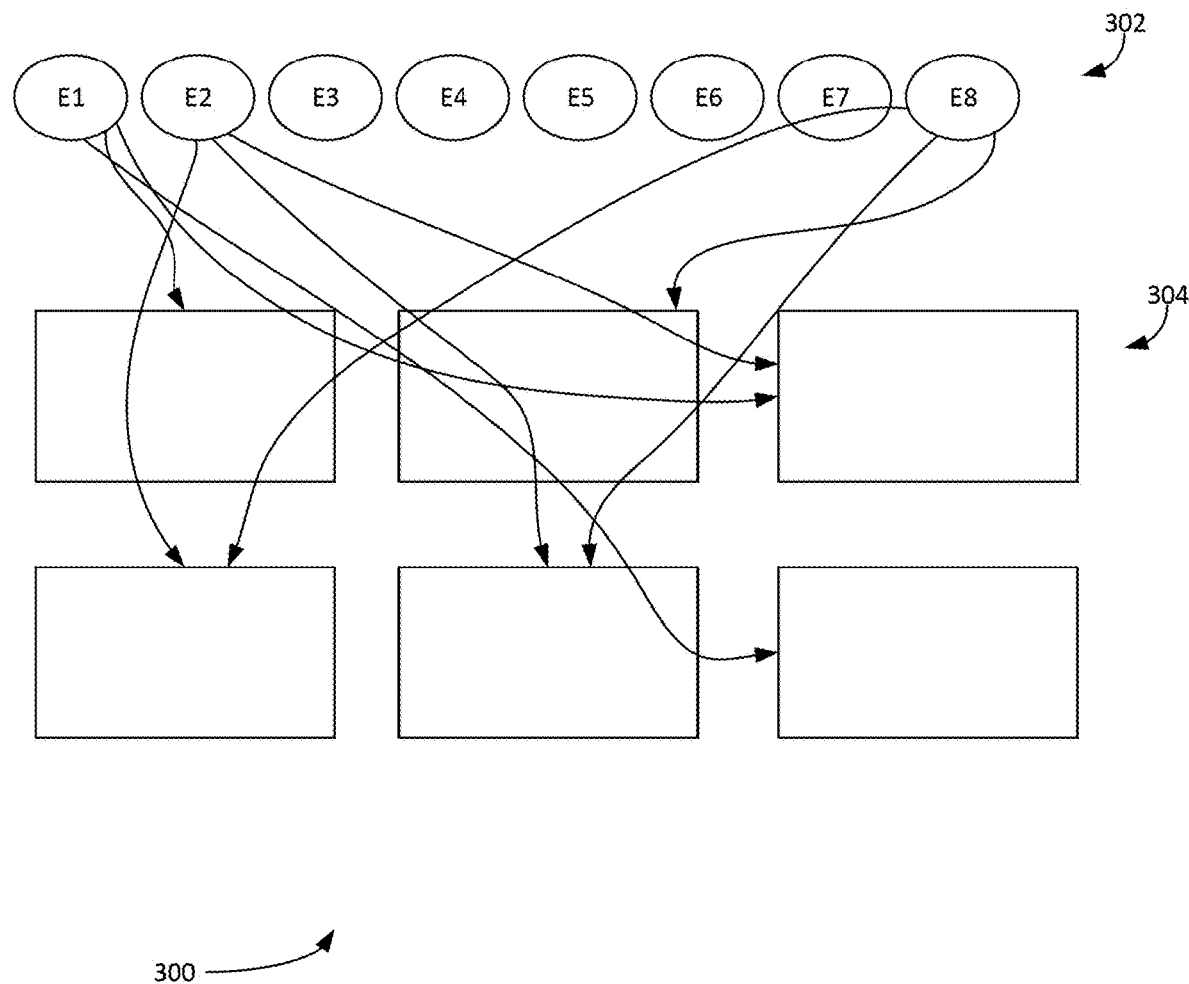
FIG. 3 illustrates an example schematic of a near-neighbors process, according to some embodiments.

FIG. 3 illustrates an example schematic of a near-neighbors process 300, according to some embodiments. This can be implemented by step 202. Step 202 can generate groups of near neighbors 304 of identities from entities E1-E8 302 that are likely to match. Step 202 generates likely matches ensuring with high probability that true positives at least fall in one of the near neighbor groups.

A custom function can be easily plugged-in to generate near neighbors. For example, step 202 can generate a set of keys on each event and group them by the keys.

The generated key can be:

$nnf(e_1) = \{k_{11}, k_{12}, k_{13}, ...k_{1m}\}$ $nnf(e_2) = \{k_{21}, k_{22}, k_{23}, ...k_{2m}\}$

...

The group by key can be:

$k_{11} \rightarrow \{e_1, e_6, e_7, ...\}$

...

Returning to FIG. 2, in step 204, process 200 can implement pairwise matching. Step 204 uses a pre-built AI-based model and set of business rules on pairs of identities in a block. In this way, step 204 can infer whether the pair match or not. The custom model can be plugged-in. Step 204 returns all the matched pairs. Each AI-based model can be built for a specific type of real-world entity. For example, an AI-based model can match address, names, certain behavior, etc. to a customer ID based on a probability of a match.

AI-based models use, inter alia: Random Forest Classifier, Artificial Neural Network and/or BERT encoding. These models can be trained on pairs identities. During training, the models can learn to distinguish differences across the pairs which can predict either a positive or negative match.

Figure 4:
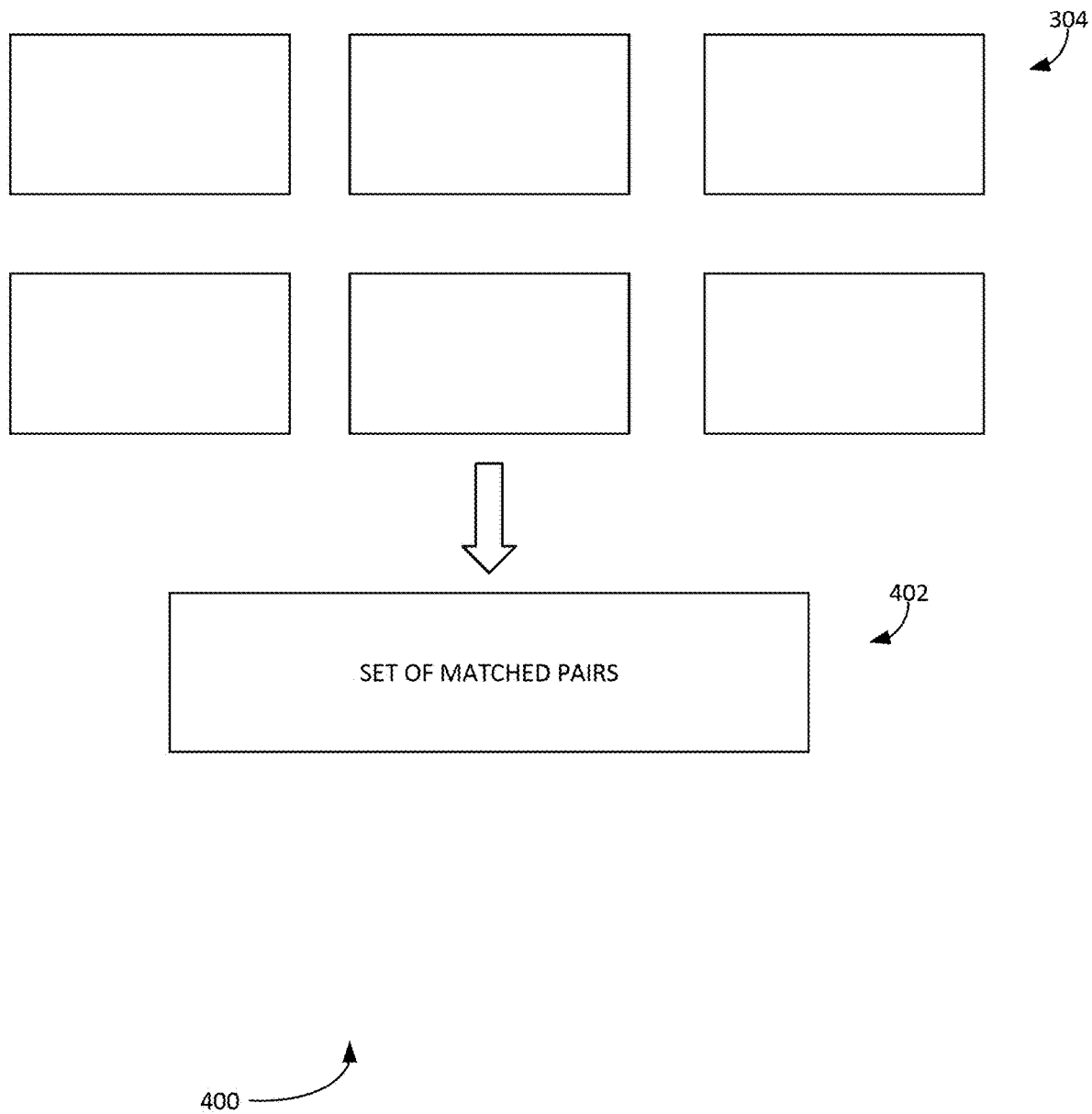
FIG. 4 illustrates an example of a schematic of a pairwise matching process, according to some embodiments.

FIG. 4 illustrates an example of a schematic of pairwise matching, according to some embodiments. Step 204 can use a pre-built matching function based on an AI architecture. Examples of a pre-built matching function for a person entity can include, inter alia: matching of names, matching of addresses, etc. Step 204 can use a matching function that returns a probability of a matching given a pair of identity. Step 204 can use a plug-in of custom business matching rules and constraints. Step 204 can re-train a pre-trained model (e.g. transfer learning) and/or build a custom model using an Entity Resolution (ER) Workbench. The ER Workbench is an application of an AI-model to perform pairwise matching. As shown in FIG. 4, step 204 can compare entities with each near neighbor group (e.g. of groups of near neighbors 304) to generate probability of a match in set of matched pairs 402:

$mf(e_i, e_j)$=probability of match

If $(mf(e_i, e_j))$>threshold then a match.

Returning to the description of process 200, in step 206, process 200 can implement transitive closure. Step 206 can perform transitive closure on the matched pairs (e.g. using pairwise matching discussed supra). Step 206 uses a distributed connected component algorithm to scale to hundreds of millions of pairs. Step 206 returns the transitive closure of the matched pairs.

Figure 5:
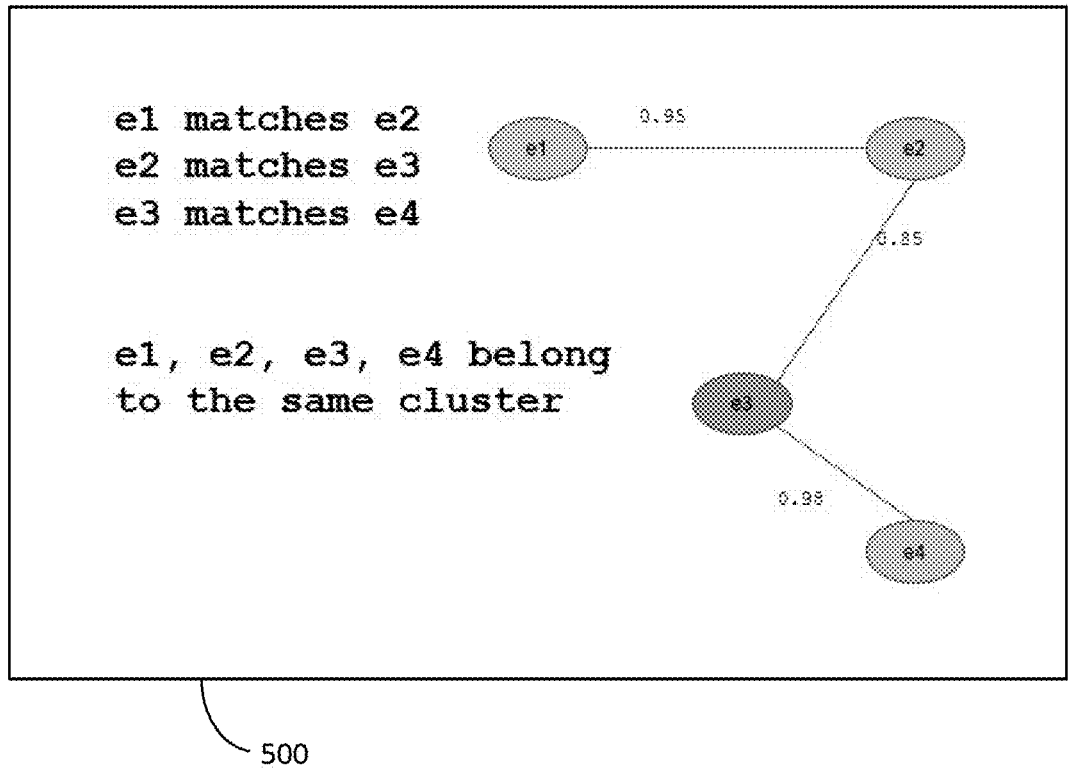
FIG. 5 illustrates an example schematic of a transitive closure process, according to some embodiments.

FIG. 5 illustrates an example schematic 500 of a transitive closure process, according to some embodiments. As shown, step 206 can apply transitive closure on each of the pairs of matched identities and create the clusters.

In step 208, process 200 can implement a cluster split (e.g. correlation clustering). The transitive closure can result in a cluster that is imperfect (e.g. contains conflict(s)). Transitive closure on pairs of matching entities can create clusters of entities that contain conflict. Step 208 can apply a two-disagreeing captain algorithm (e.g. see infra) to split the cluster two resolve the conflicts. Step 208 can return clusters containing matched identities.

Figure 6:
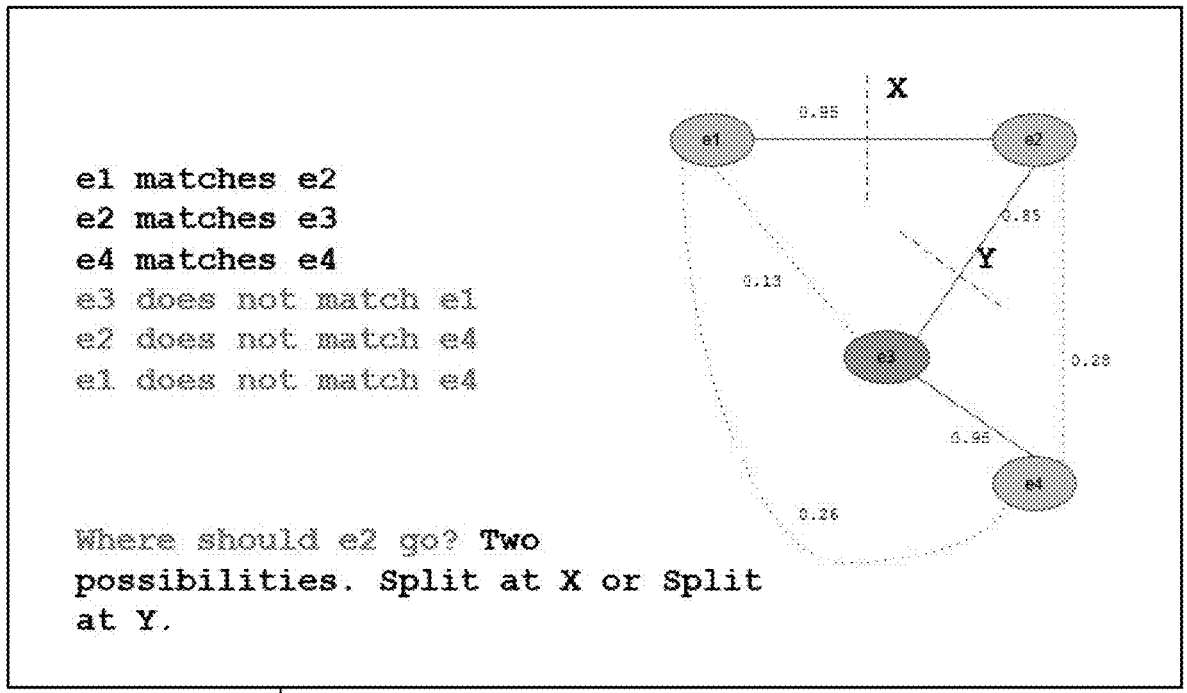
FIG. 6 illustrates an example schematic for cluster splitting, according to some embodiments.

FIG. 6 illustrates an example schematic 600 for cluster splitting, according to some embodiments. Schematic 600 can be used to implement step 208. In this example, step 208 applies constraints to split the cluster by using a two-disagreeing captain algorithm. The two-disagreeing captain algorithm chooses two captains. Each captain represents a cluster of the two clusters. The two-disagreeing captain algorithm greedily assigns other members in the original cluster to each of the captains. It then calculates an MLE of the two resultant clusters. When the resultant split maximizes the probability then a split is implemented. This process is repeated for every split till a split does not maximize the probability.

Returning to the description of FIG. 2, in step 210, process 200 can implement stable ID assignment. Matched clusters are assigned "Stable ID". A stable ID preserves the ID that was assigned in a previous ID assignment. In case of an ID split, step 210 minimizes the change in ID assignment. Step 210 returns a cluster with a stable ID.

FIG. 7 illustrates an example schematic 700 illustrating a stable identifier (ID) assignment, according to some embodiments. Schematic 700 can be used to implement step 210. As shown, matched clusters are assigned a Stable ID.

A custom rule can be plugged in on which ID should be chosen. Step 210 can return clusters with stable IDs. Custom rules for ID assignments can be used to determine which previous ID to choose when an ID splits or when IDs are merged into one. For example, a custom rule for an ID merge or ID split can preserve the ID of the largest cluster.

Figure 8:
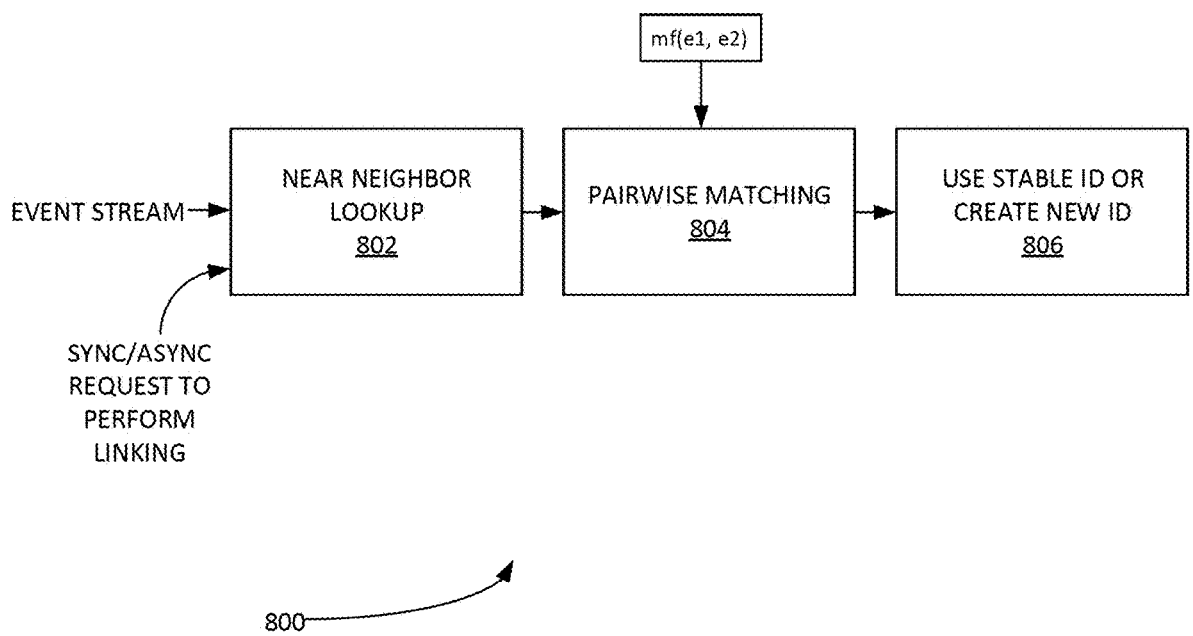
FIG. 8 illustrates an example process for real-time/on-demand linking (RTL), according to some embodiments.

FIG. 8 illustrates an example process 800 for real-time/on-demand linking (RTL), according to some embodiments. Unlike with high-throughput matching, process 800 may not take into account the secondary (or tertiary effects) of matching. A secondary impact of a matching is when a matching may affect other matching previously performed. In step 802, process 800 can implement a near neighbor lookup. Step 802 can receive and utilize an event stream data and/or a synchronous/asynchronous request to perform linking. In step 804, process 800 can implement pairwise matching. In step 806, process 800 can use a stable ID or create a new ID.

Process 800 can implement real-time linking by linking identity(s) in a low latency context (e.g. in milliseconds). Process 800 may, in some embodiments, not consider the secondary impact of a match of real-time events but guarantees the correctness of the match. After the Lambda Switch, when real-time events received until the switch are fed into a high-throughput linking, then the secondary and subsequent impacts can be considered.

Figure 9:
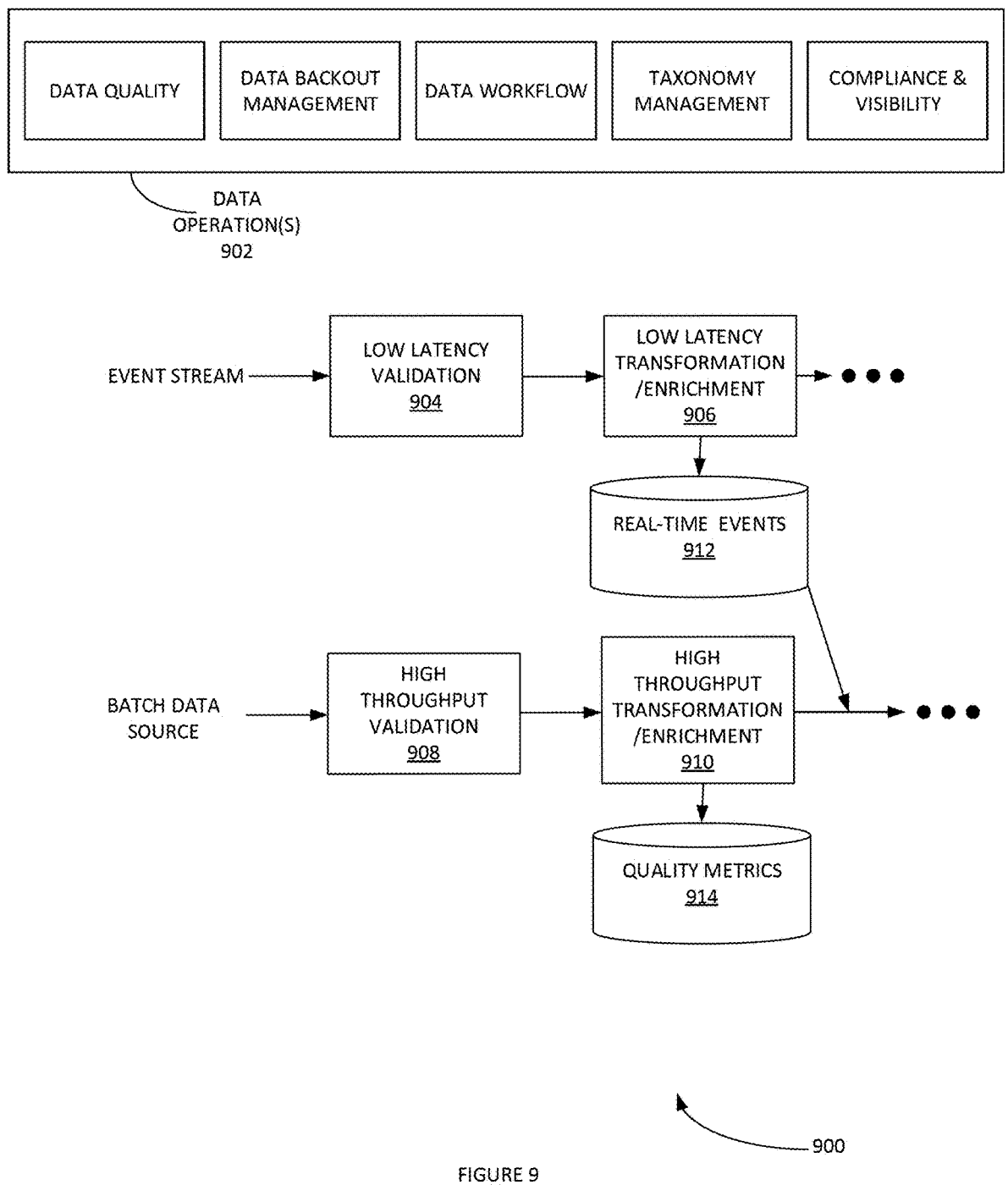
FIG. 9 illustrates an example data management process for use herein, according to some embodiments.

FIG. 9 illustrates an example data management process 900 for use herein, according to some embodiments. Data management process 900 can be used to minimize data preparation. Data management process 900 can use data operations management module 902. Data operations management module 902 can include modules for, inter alia: data quality, data backout management, data workflow, taxonomy management, compliance, and visibility, etc.

More specifically, in step 904, process 900 can implement low latency validation on the events stream. In step 906, process 900 can implement low latency transformation/enrichment. This can generate real-time events 912.

In step 908, process 900 can implement high-throughput validation. The output of step 908 can be fed into step 910. In step 910 process 900 can implement a high-throughput transformation/enrichment. High-throughput transformation/enrichment can provide output that is integrated with real-time events 912. High-throughput transformation/enrichment can also generate quality metrics 914.

Data management process 900 can also provide for implementing, inter alia: data quality management, data backup management, legal compliance workflows, compliance, and visibility protocols, etc.

FIG. 10 illustrates an example schematic 1000 of a composite profile creation, according to some embodiments. As shown, an SQL-like Entity Query Language (EQL) can be used to calculate various attributes and/or properties of the entity. All the matched attributes of the entity can be utilized. It is noted that EQL has a rich set of predefined functions to calculate entity specific attributes (e.g. MOST_FREQUENT, MONTHLY, LAST_ACTIVE etc.). Additionally, machine learning (ML) inference functions can be used in EQL as a regular function.

Figure 11:
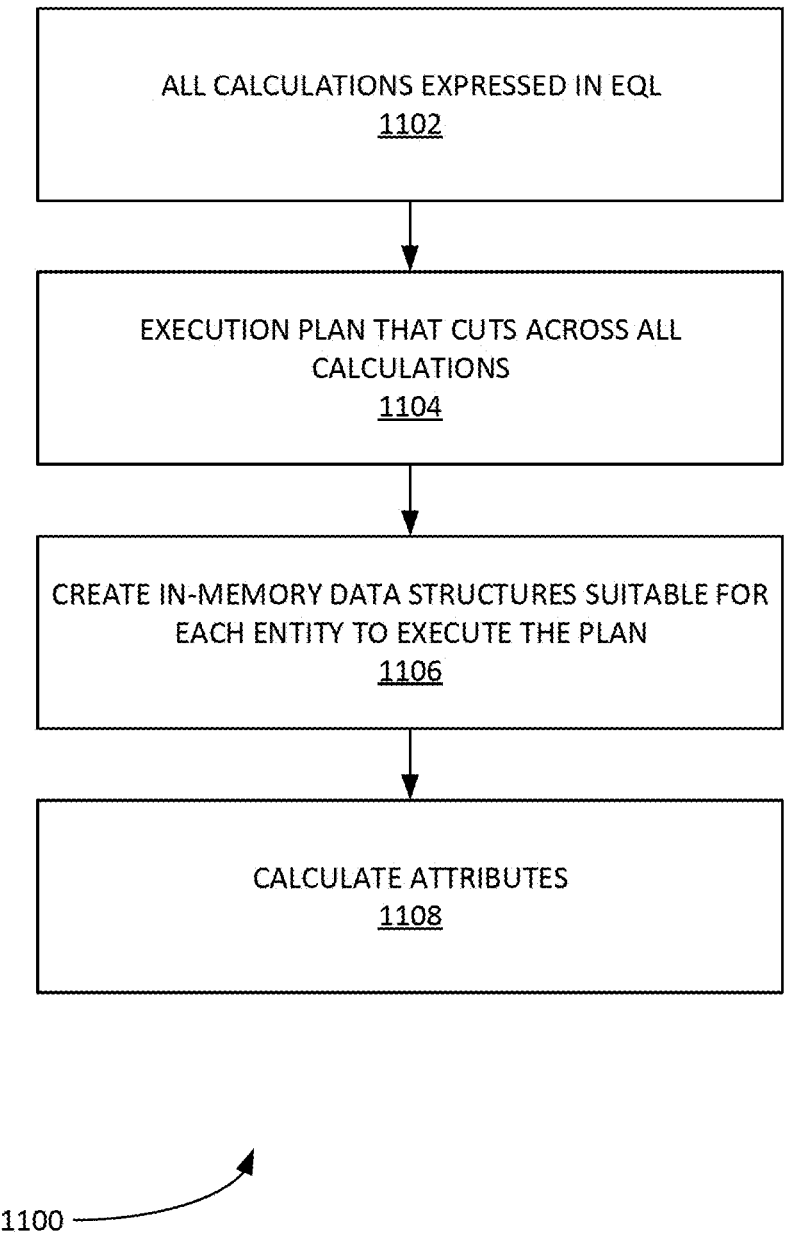
FIG. 11 illustrates an example process for composite profile creation, according to some embodiments.

FIG. 11 illustrates an example process 1100 for composite profile creation, according to some embodiments. In step 1102, all calculations are expressed in an EQL format. In step 1104, process 1100 can implement an execution plan that cuts across all calculations. In step 1106, process 1100 can create in-memory data structures suitable for each entity to execute the plan. In step 1108, process 1100 can calculate the relevant attributes.

Additional Example Computer Architecture and Systems

Figure 12:
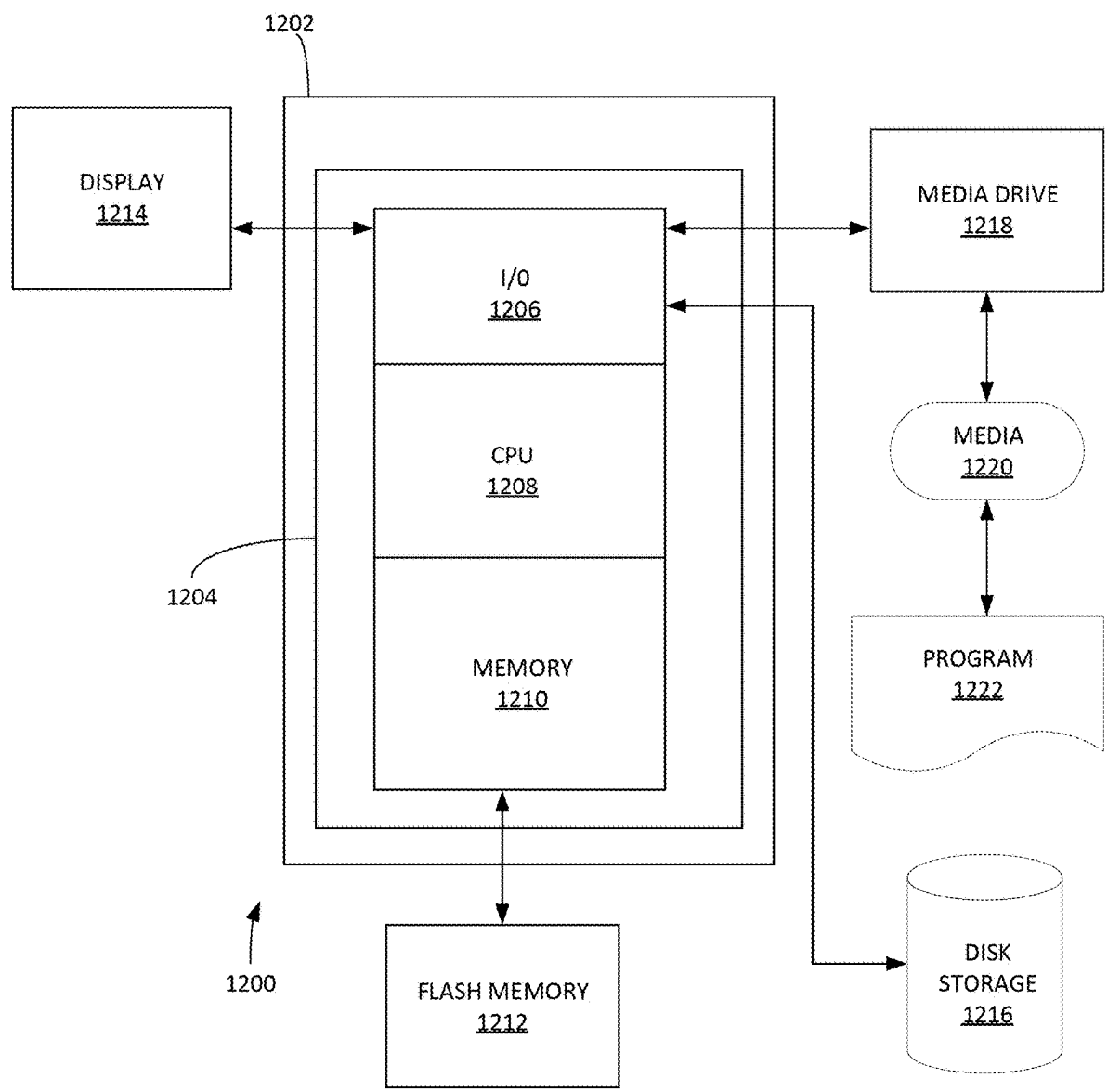
FIG. 12 is a block diagram of a sample computing environment that can be utilized to implement various embodiments.

FIG. 12 depicts an exemplary computing system 1200 that can be configured to perform any one of the processes provided herein. In this context, computing system 1200 may include, for example, a processor, memory, storage, and I/O devices (e.g., monitor, keyboard, disk drive, Internet connection, etc.). However, computing system 1200 may include circuitry or other specialized hardware for carrying out some or all aspects of the processes. In some operational settings, computing system 1200 may be configured as a system that includes one or more units, each of which is configured to carry out some aspects of the processes either in software, hardware, or some combination thereof.

FIG. 12 depicts computing system 1200 with a number of components that may be used to perform any of the processes described herein. The main system 1202 includes a motherboard 1204 having an I/O section 1206, one or more central processing units (CPU) 1208, and a memory section 1210, which may have a flash memory card 1212 related to it. The I/O section 1206 can be connected to a display 1214, a keyboard and/or other user input (not shown), a disk storage unit 1216, and a media drive unit 1218. The media drive unit 1218 can read/write a computer-readable medium 1220, which can contain programs 1222 and/or data. Computing system 1200 can include a web browser. Moreover, it is noted that computing system 1200 can be configured to include additional systems in order to fulfill various functionalities. Computing system 1200 can communicate with other computing devices based on various computer communication protocols such a Wi-Fi, Bluetooth® (and/or other standards for exchanging data over short distances includes those using short-wavelength radio transmissions), USB, Ethernet, cellular, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by United States patent:

1. A computerized method for implementing a matching platform of a Lambda Architecture for entities comprising:
   in a real-time data processing layer:
      implementing a real-time linking of entities from an input event stream;
      storing an output of the real-time linking in a state change store;
   in a high-throughput layer;
      implementing a high-throughput linking of entities from a batch data source stream utilizing a near-neighbor linking process comprising including entities in a near-neighbor group, performing pairwise matching to each entity in each near-neighbor group to generate a probability of a match in a set of matched pairs, and creating a match if the probability of a match exceeds a threshold;

storing an output of the high-throughput linking of entities in a state store to generate a unified and consistent view of the entities;

providing a Lambda Switch between the real-time data processing layer and the high-throughput layer, wherein the Lambda Switch is configured to ensure that a set of states of the entities remain consistent when an on-demand linking switches a serving from an older generation of the state store and the state change store to a new generation of the state store and the state change store; and implementing the on-demand linking using the state change store and the state store in response to a query from an external application.

2. The computerized method of claim 1, wherein the real-time data processing layer process data is provided in a data stream.

3. The computerized method of claim 2, wherein the data stream comprises an events stream.

4. The computerized method of claim 1, wherein an entity of the entities comprises a real-world entity.

5. The computerized method of claim 4, wherein the real-world entity comprises customer data about a person, a company data, or a product data.

6. The computerized method of claim 1, wherein a linking process comprises a task of identifying records that belong to a same real-world entity associated with the entity.

7. The computerized method of claim 1, wherein the real-time data processing layer and the high-throughput layer are included in a data processing layer.

8. The computerized method of claim 1, wherein the real-time linking identifies the one or more records that belong to a real-world entity.

9. The computerized method of claim 8, wherein the real-time linking is implemented by linking one or more records of the real-world entity in a millisecond-range low latency context.

10. The computerized method of claim 1 further comprising:
with the Lambda Switch:
transferring the data received in the real-time data processing layer into the high-throughput layer.

11. The computerized method of claim 10 further comprising:
with the Lambda Switch:
processing a combined real-time data and batch data while preserving a consistency of the combined results.

12. The computerized method of claim 11, wherein the high-throughput layer comprises a software module that can process hundreds of terabytes using a cluster of computer processing systems.

13. The computerized method of claim 1, wherein the implementing a real-time linking of entities from an input event stream comprises:
creating a cluster of records that belongs to the real-world entity.

14. The computerized method of claim 13, wherein the input event stream comprises a stream of records comprising information about the entities.

15. A computerized system comprising a matching platform of a Lambda Architecture for entities comprising:
at least one memory storing sequences of instructions; and
at least one processor configured to execute the sequences of instructions which, when executed, causes the at least one processor to execute:
a real-time data processing layer that:
implements a real-time linking of entities from an input event stream, and stores an output of the real-time linking in a state change store;
a high-throughput layer that:
implements a high-throughput linking of entities from a batch data source stream utilizing a near-neighbor linking process comprising including entities in a near-neighbor group, performing pairwise matching to each entity in each near-neighbor group to generate a probability of a match in a set of matched pairs, and creating a match if the probability of a match exceeds a threshold, and stores an output of the high-throughput linking of entities in a state store to generate a unified and consistent view of the entities;
a Lambda Switch between the real-time data processing layer and the high-throughput layer, wherein the Lambda Switch is configured to ensure that a set of states of the entities remain consistent when an on-demand linking switches a serving from an older generation of the state store and the state change store to a new generation of the state store and the state change store; and
an on-demand linking module that implements the on-demand linking using the state change store and the state store in response to a query from an external application.

16. The method of claim 1, wherein the step of implementing a high-throughput linking of entities from a batch data source stream further comprises the step of performing a transitive closure process.

17. The method of claim 16, wherein the transitive closure process further comprises a cluster split based on a two-disagreeing captain algorithm.

* * * * *